M. C. NIXON.
HAY RAKE.
APPLICATION FILED FEB. 6, 1911. RENEWED SEPT. 5, 1914.
1,120,401.
Patented Dec. 8, 1914.
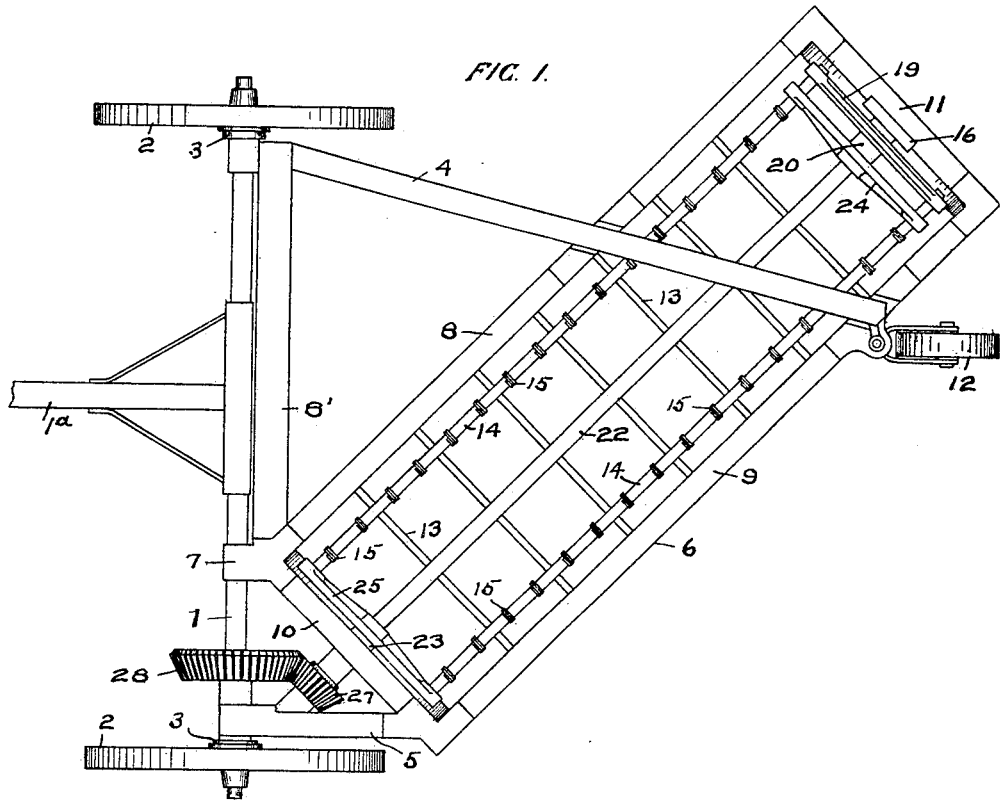
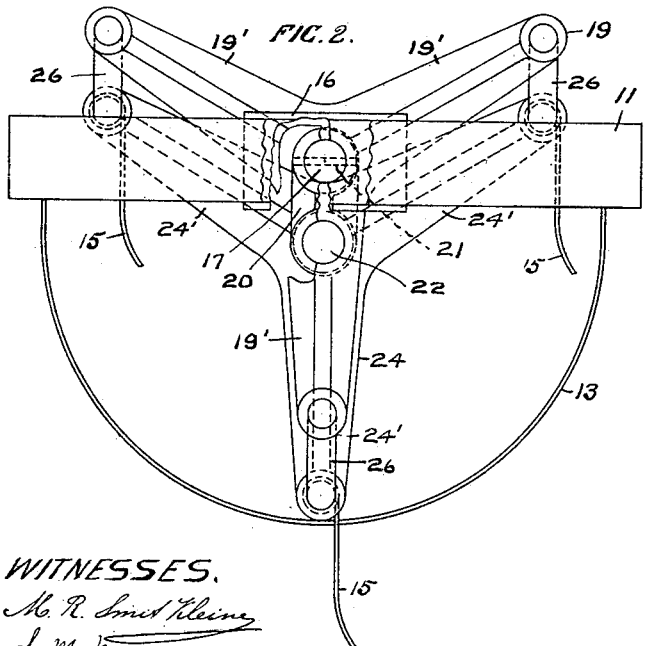
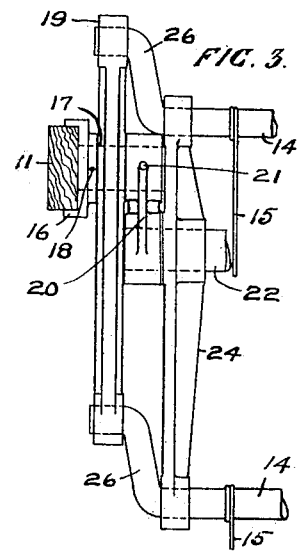
WITNESSES.
INVENTOR.
Moses C. Nixon

UNITED STATES PATENT OFFICE.

MOSES C. NIXON, OF LIMA, OHIO.

HAY-RAKE.

1,120,401.  Specification of Letters Patent.  Patented Dec. 8, 1914.

Application filed February 6, 1911, Serial No. 606,849. Renewed September 5, 1914. Serial No. 860,467.

*To all whom it may concern:*

Be it known that I, MOSES C. NIXON, residing at Lima, in the county of Allen and State of Ohio, have invented certain new and useful Improvements in Hay-Rakes, of which the following is a specification.

The invention relates to what is known as side-delivery hay rakes, the object being to provide a mechanism which will improve the operation and efficiency of the machine; and consists, preferably, in the construction hereinafter described which may be varied without departing from the spirit of my invention.

Figure 1 is a plan view of a hay rake provided with my invention; Fig. 2, an enlarged end view of frame, showing mechanism for maintaining the rake teeth in a dependent position, and Fig. 3, a side elevation of the same.

Referring to the drawings, 1 is the axle, 2, 2 the supporting wheels which are connected to the axle by suitable differential connections contained within the hubs 3, 3 of the wheels. Side bars 4 and 5 are loosely secured to axle 1 and project rearwardly from the axle, their outer extremities being connected to frame 6. The forward corner of the frame is also connected to the axle in a similar manner by connection 7, a bar 8′, which is parallel to the axle 1, being secured to bar 4 and corner of frame 6. Frame 6 is disposed diagonally to the line of draft of the machine, so as to enable the teeth to deliver the hay at one side of the machine. Frame 6 is composed of side bars 8, 9 and end bars 10, 11. A suitable caster wheel 12 is mounted on bar 9 to support the frame at its rear side. The usual straps or rods 13 fixed to side bars 8, 9, serve to prevent the hay from winding about the tooth carrying shafts or bars 14.

A casting 16 is secured to the intermediate portion of end bar 11 of frame 6 and carries a forwardly projecting pivot 17, the pivot being secured to the casting in any suitable manner, as by pin 18, or it may be formed integral with the casting. An idler spider 19 is loosely mounted on pivot 17 and adjacent the inner face of the spider is a depending bracket 20, which is secured to pivot 17 by suitable means, as by pin 21. The lower portion of bracket 20 serves as a bearing for one end of reel shaft 22. The opposite end of reel shaft 22 is supported in a suitable bearing 23, which is mounted on end bar 10 of frame 6.

A spider 24 is secured to reel shaft 22 adjacent to bracket 20, the arms 24′ of which are the same length as arms 19′ of spider 19. A similar spider 25 is secured to reel shaft 22 at its forward extremity and adjacent end bar 10. Loosely supported in the outer extremities of corresponding arms of spiders 24 and 25 are teeth carrying shafts or bars 14, the teeth 15 being secured to the shafts or bars in a depending position in any suitable manner. The rear end of each shaft 14 is provided with a crank 26 which is loosely connected to the outer end of the corresponding arm 19′ of idler spider 19.

The forward extremity of reel shaft 22 is provided with a bevel pinion 27 which is adapted to mesh with a bevel gear 28 which is secured to axle 1.

The forward movement of the machine rotates reel shaft 22 by means of gear 28 and pinion 27. The rotation of the shaft carries with it spiders 24 and 25 and also teeth carrying shafts 14. Since the rear ends of the latter shafts have a cranked connection to idler spider 19, which spider is eccentrically mounted relative to spiders 24, 25, and the arms of which are equal in length to that of the arms of spiders 24, 25, the spider 19 is also rotated on pivot 17, thereby compelling the teeth 15 to always remain in a dependent vertical position in the well understood manner.

For clearness and convenience it is explained the term "outside" in reference to pivot as used in the claims means, a plane laid lengthwise with bearings and outside the periphery of the pivot of the idler spider.

What I claim is:

1. In a rotary hay-rake of that type embodying an idler spider eccentrically mounted with relation to the rake axis, and connected by cranks with the teeth carrying bars for maintaining the teeth in position, the combination of a frame, a pivot for said idler spider mounted on said frame, a bearing connected with and carried by said pivot eccentric thereto and outside the circumference thereof, a rotary rake structure rigidly secured to and supported on a revoluble shaft, said shaft journaled at one end in said bearing supported on said pivot and at the other end in a bearing carried by said frame, substantially as set forth.

2. In a rotary side-delivery hay-rake having an idler spider mounted eccentric to the axis of the rake and connected to the teeth-carrying bars by crank connections, the combination of a frame, a pivot on which said idler spider is mounted, a bearing carried by said pivot eccentric to and outside the circumference thereof, a rotary rake structure, a shaft carrying said rake structure rigidly secured thereto and journaled at one end in said bearing and at the other end in another bearing carried on the other end of the frame, substantially as set forth.

3. A hay rake having a frame diagonally disposed to the line of draft, a pivot carried by said frame and having an idler spider revolubly mounted thereon, a bearing connected with and carried by said pivot eccentric thereto and outside the circumference thereof, a rotatable structure having journals rigidly secured thereto and carrying rake teeth, one of said journals being revolubly mounted in said bearing and the other journal in a bearing carried by said frame, and means connecting said spider and teeth whereby the position of the latter is controlled.

In witness whereof I hereunto sign my name this 4th day of February, 1911.

MOSES C. NIXON.

Witnesses:
C. F. WERNER,
A. J. SULLIVAN.

Copies of this patent may be obtained for five cents each, by addressing the "Commissioner of Patents. Washington, D. C."